Aug. 17, 1937.　　　G. M. COFFIN　　　2,090,571
WEED GUARD FOR FISHHOOKS
Filed Dec. 5, 1934
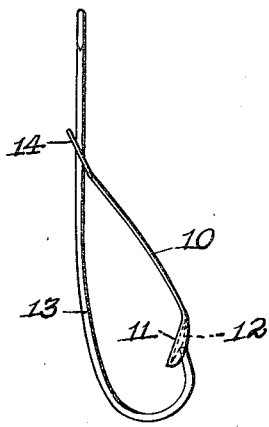
Fig. 1.
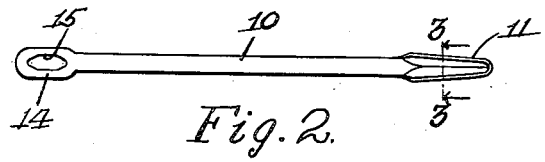
Fig. 2.
Fig. 3.
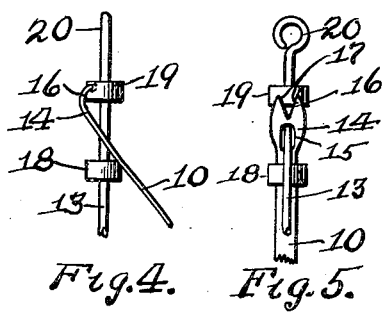
Fig. 4.　Fig. 5.
INVENTOR.
George M. Coffin
BY
Brayton Richards
ATTORNEY.

Patented Aug. 17, 1937

2,090,571

UNITED STATES PATENT OFFICE 2,090,571

WEED GUARD FOR FISHHOOKS

George M. Coffin, Hinsdale, Ill.

Application December 5, 1934, Serial No. 756,106

5 Claims. (Cl. 43—38)

The invention relates to improvements in weed guards for fishhooks and has for its primary object the provision of an improved guard of the character indicated which is of simple construction and highly efficient in use.

Another object of the invention is the provision of a guard of the character indicated, which may be provided independently of the hook and subsequently applied by the user to hooks of various sizes and shapes.

Other objects will appear hereinafter.

The invention consists in the combinations and arrangements of parts hereinafter described and claimed.

The invention will be best understood by reference to the accompanying drawing forming a part of this specification, and in which Fig. 1 is a side view of a fishhook equipped with a weed guard embodying the invention;

Fig. 2, an enlarged plan view of the weed guard detached;

Fig. 3, a section taken substantially on line 3—3 of Fig. 2.

Fig. 4 is a partial side view of a fishhook equipped with a weed guard embodying a modification of the invention; and Fig. 5, a rear view of the same.

The embodiment of the invention illustrated in the drawing comprises a resilient member 10 formed from a strip of sheet steel having an enlargement at one end bent as indicated into substantially V-shaped channel form, thereby forming a pocket 11 adapted and arranged to engage and guard the barb 12 of the fishhook 13. At its other end the strip 10 is provided with an enlargement 14 having an opening 15 therein of a size to fit freely over the barb 12 of the fishhook and slidably engage the shank of the fishhook, as indicated.

The strip 10 is formed as indicated so that when placed in position with the pocket 11 engaging the barb 12 at the throat end of the hook, the strip 10 has to be bent or sprung inwardly to effect such engagement. This is effected by making the opening 15 somewhat shorter than that necessary to accommodate the shank of the fishhook when the strip 10 is in the position indicated in Fig. 1. As will be observed, the ends of the opening 15 are substantially V-shaped in form and are so designed and arranged that this bending or springing of the strip 10 causes a clamping or engaging action on the shank of the hook and also presses the pocket 11 outwardly against the barb of the hook so as to lightly hold the parts in place until struck by a fish. When a fish strikes the hook the strip 10 is bent inwardly sufficiently to dislodge the pocket 11 from the barb of the hook, thereby releasing the clamping engagement on the shank of the hook and permitting the guard to slide downwardly on said shank so as to offer no further interference with the action of the hook engaging the mouth of the fish in the usual way.

By this arrangement a weed guard for fishhooks is provided which is capable of economical production and highly efficient in use. The exemplification of the invention described may be made from a simple stamping of sheet spring steel and readily applied to different sizes and shapes of hooks by the user when desired or necessary.

In the modification illustrated in Figs. 4 and 5, the enlargement 14 on the strip 10 is provided with a curved extension 16 having a central V-shaped notch forming the same into two (2) pointed prongs 17. Rubber collars 18 and 19 having central bores adapted and arranged to pass over the barb of the hook and frictionally interlock with the shank thereof, are arranged above and below the strip 10 as shown.

By this arrangement the strip 10 may be definitely positioned on the shank of the hook so as to prevent accidental displacement. By adjusting the lower collar 18 so that the strip 10 rests thereon, as indicated in Fig. 4, the resiliency of the strip 10 may be adjustably increased as desired. By arranging the collar 19 in position to receive the prongs 17 as indicated, the resiliency of the strip 10 may be further increased and the strip more definitely locked on the shank of the hook. If desired, the collar 19 may be omitted and the notch between the prongs 17 permitted to engage the hook shank, or the prongs 17 permitted to engage the eye 20 of the hook. In this way a guard is provided which cannot be accidentally displaced, may be applied to practically any size of a hook, and in which the resiliency of the guard may be adjusted as desired.

While I have illustrated and described the preferred forms of construction for carrying the invention into effect, these are capable of variation and modification without departing from the spirit of the invention. I therefore do not wish to be limited to the precise details disclosed, but would desire to avail myself of such variations and modifications as fall within the scope of the appended claims.

I claim:

1. A device of the class described comprising a resilient member provided at one end with means for engaging and guarding the throat end of a fishhook and at the other end with means for adjustably engaging the shank of the hook and being so shaped as to require bending to cause such engagements, the means engaging the hook shank being such that said bending causes sufficient clamping engagement with the shank to hold said guard in place until struck by a fish.

2. A device of the class described comprising a resilient member provided at one end with means for engaging and guarding the throat end of a fishhook and at the other end with means for detachably engaging the shank of the hook and being so shaped as to require bending to cause such engagements; means on said member operable through the tension of said bending for temporarily holding said guard in place until struck by a fish; and a collar adapted to be arranged on the hook shank to prevent removal of said resilient member.

3. A device of the class described comprising a resilient member provided at one end with means for engaging and guarding the throat end of a fishhook and at the other end with means for detachably engaging the shank of the hook and being so shaped as to require bending to cause such engagements; means on said member operable through the tension of said bending for temporarily holding said guard in place until struck by a fish; and two rubber collars adapted and arranged to pass over the barb of the hook and engage the shank thereof to position said resilient member thereon.

4. A device of the class described comprising a flat resilient member, provided at one end with a pocket for engaging and guarding the barb of a fishhook and at its other end with an opening of a size and shape passing freely over the barb of a fishhook; pointed, hooked prong extensions on said other end of said resilient member having a V-shaped notch between them; and two rubber collars adapted and arranged to pass over the barb of the hook and engage the shank thereof on opposite sides of said resilient member to position the same thereon.

5. The combination with a fishhook of a resilient member provided at one end with means for engaging and guarding the throat end of a fishhook, and at the other end with means for detachably and adjustably interlocking with the shank of the hook below the eye thereof and so shaped and associated as to require bending to cause such engagements; and means for utilizing the tension of said bending for temporarily holding said guard in place until struck by a fish.

GEORGE M. COFFIN.